June 17, 1958 J. P. DUVAL 2,838,815
CENTRIFUGAL MOULDING MACHINE
Filed Oct. 6, 1953 5 Sheets-Sheet 1
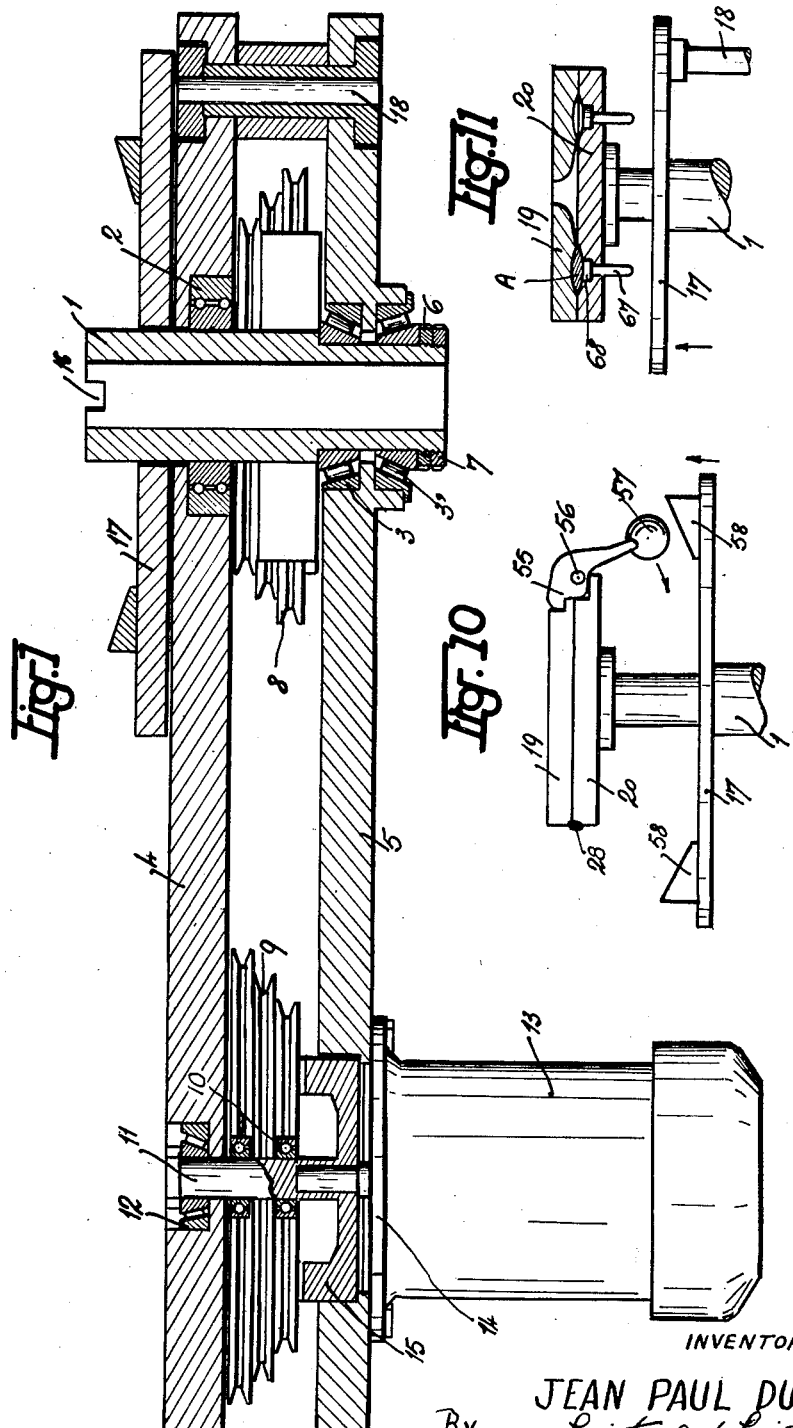
INVENTOR
JEAN PAUL DUVAL
By Linton and Linton
ATTORNEYS

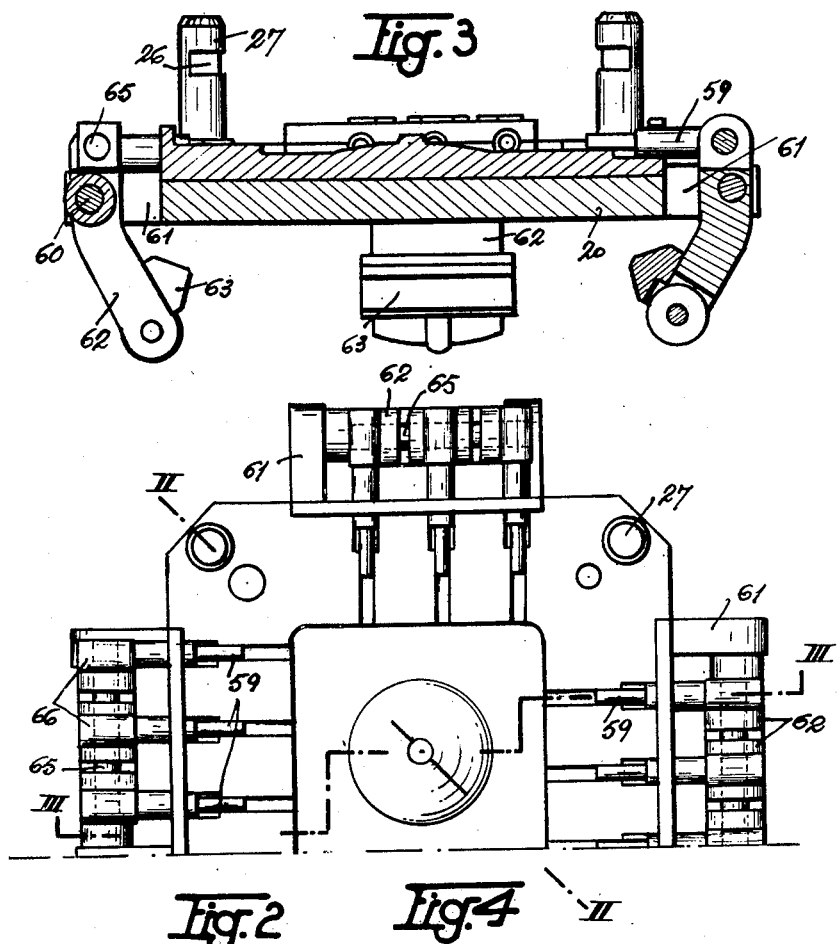
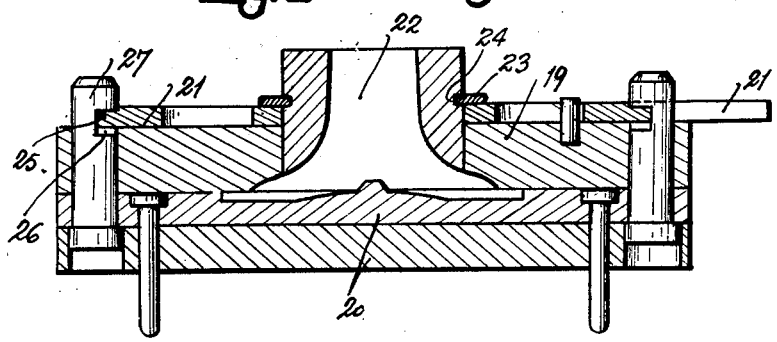

June 17, 1958   J. P. DUVAL   2,838,815
CENTRIFUGAL MOULDING MACHINE
Filed Oct. 6, 1953   5 Sheets-Sheet 3
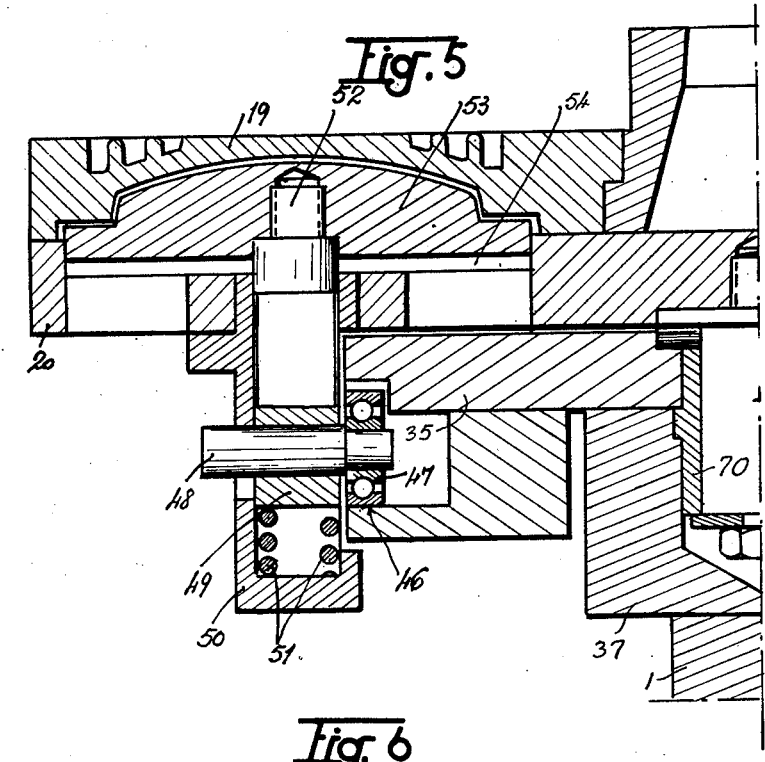
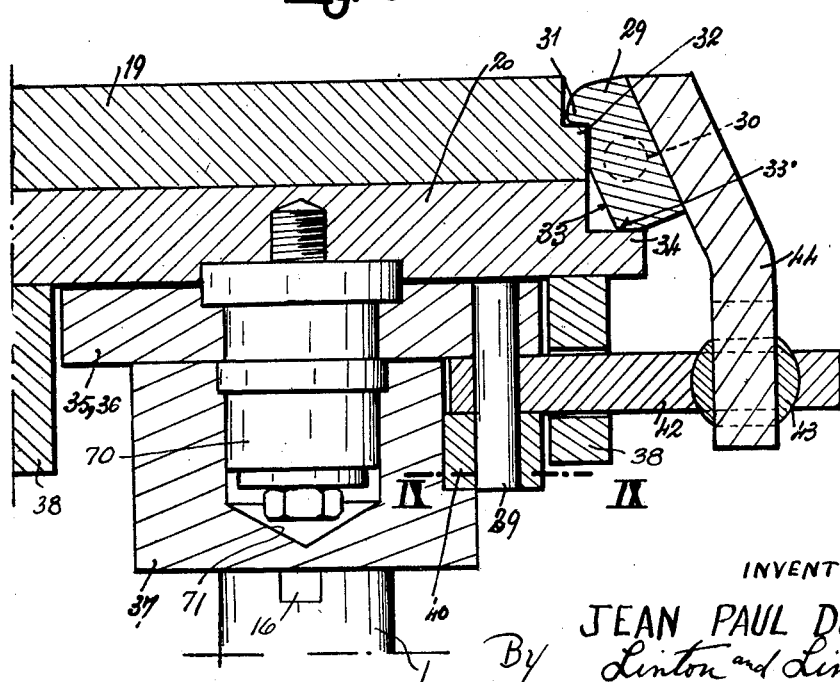
INVENTOR
JEAN PAUL DUVAL
By Linton and Linton
ATTORNEYS

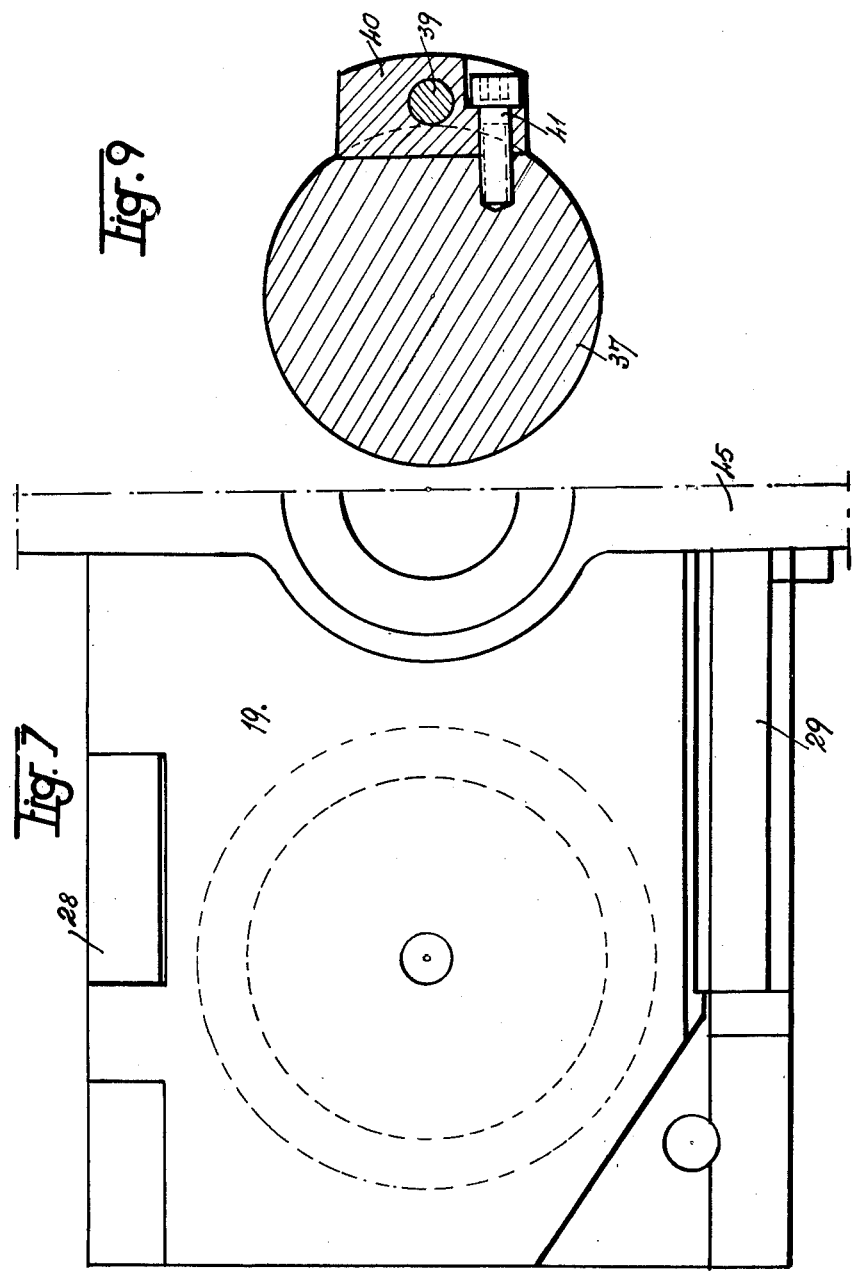

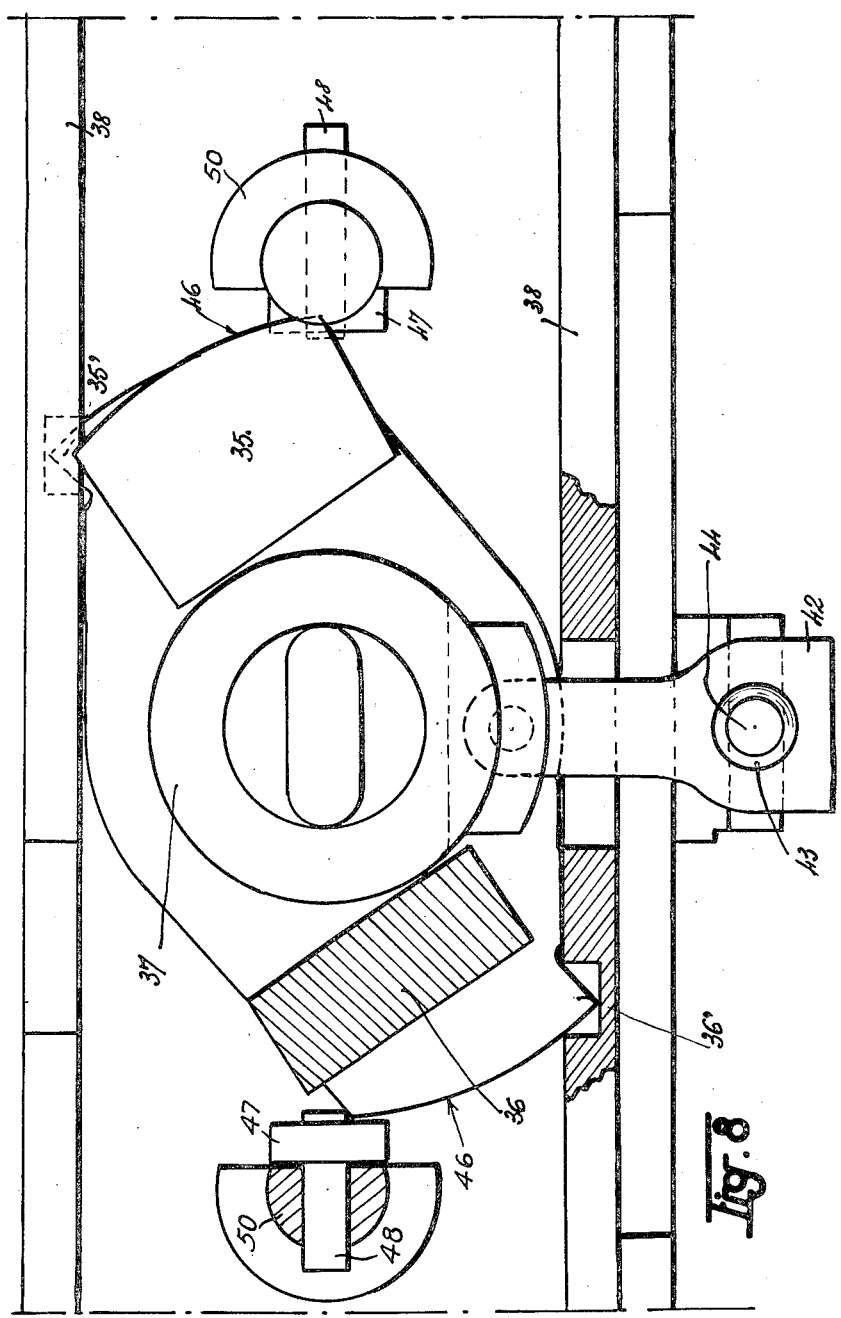

//

2,838,815

CENTRIFUGAL MOULDING MACHINE

Jean Paul Duval, Paris, France, assignor to Max Adolphe Bunford, Monte-Carlo, Monaco Application October 6, 1953, Serial No. 384,370

7 Claims. (Cl. 22—65)

The present invention relates to centrifugal casting machines and essentially comprises a stationary supporting plate in which is mounted a shaft, preferably hollow, adapted to receive removable and interchangeable moulds and driven in rotation through any appropriate transmission means by a motor provided on the side of the machine, so that said shaft is entirely free on top and at bottom, whereby any feeding device or the like may be readily adapted, without control and transmission means standing in the way.

The driving control means will preferably comprise gearing and braking devices for the rotation and stopping of the moulds at will, as at the beginning and end of each moulding operation, while the motor is allowed to rotate continuously.

The removable and interchangeable moulds may be of the type comprising entirely independent lids and bottoms, or the lid may be articulated on the bottom. The lid may be locked on the bottom of the mould during the moulding operation, by means of a lever pivotally mounted on the lid and provided with one or more slanting pitch or pitches each fitting in the groove of a spindle fixed to the bottom, or through any appropriate device. The lid may also be locked on the bottom of the mould during the moulding operation by means of one or more pivoting hook or hooks or the like, pivoting on the bottom of the mould and driven into locking position by the action of centrifugal force or other means, when the mould is driven in rotation. The inertia resulting from the stopping of the mould, combined eventually with a positive mechanical action may be used for bringing said hook or hooks back into unlocking position.

The inertia may be used also for locking the lid on the bottom of the mould, also for facilitating the withdrawal of the moulded pieces; also for removing the spindles or hubs formerly put in place by the action of centrifugal force.

Said centrifugal forces and inertia may act on counterweights provided at the extremity of levers or pivoting pieces, or also on levers or oscillating pieces which may in turn cooperate with pitches increasing in height or with any other driving member.

The positive mechanical action operable through inertia may be obtained with one or more abutting piece or pieces, with inclined faces, fixed, for instance to a movable plate raised at the desired moment by jacks or the like, and cooperating with the counterweights or other members operable by inertia.

Said jacks may be actuated by pressure fluid whether pneumatically or hydraulically.

In the same way, the opening of the mould, that is to say, separation of the lid from the bottom, as well as the ejection of the moulded pieces may be effected through the action of any pressure fluid, whether pneumatically or hydraulically, exerted through the intermediary of jacks and a movable plate for instance, on spindles extending through the bottom of the mould and acting on the lid of the latter and/or on the moulded pieces.

A pressure fluid feeder may allow these various operations to be automatic.

In the attached drawings, various embodiments of the invention have been illustrated by way of non limitative examples.

In the drawings:

Fig. 1 is a vertical elevational cross-section view of the machine;

Fig. 2 is a cross-section view of a mould made of two independent pieces with its locking system along II—II of Fig. 4.

Fig. 3 is a cross-sectional view of the same mould along III—III of Fig. 4 showing the device for putting in place and for removing the spindles of the hubs, the lid of the mould being off.

Fig. 4 is a partial top view of the embodiment of Fig. 3.

Fig. 5 is a semi-cross sectional view of a mould made of two parts articulated on each other.

Fig. 6 is a partial cross-sectional view at an angle of 90° with respect to the preceding one.

Fig. 7 is a semi-top view of Fig. 5.

Fig. 8 is a bottom view of the double locking lever for locking the two parts of the mould and for withdrawing the moulded pieces.

Fig. 9 is a partial cross-section view along IX—IX of Fig. 6.

Fig. 10 shows a various embodiment, in a diagrammatical elevation view, of the locking through the centrifugal force of a lid on a two parts mould articulated or not on each other.

Fig. 11 is a diagrammatical cross-section view of a device for opening the mould and eventually ejecting moulded pieces through the action of a pressure fluid.

A centrifugal force moulding machine according to the invention essentially comprises (Fig. 1) a hollow rotary shaft 1 mounted through ball bearings 2 and roller bearings 3 and 3' which serve also as abutment bearings, on two stationary plates 4 and 5 through which said hollow shaft extends, 6 and 7 are nuts and counter-nuts for holding in place the inner race of the lower roller bearing 3'.

The shaft 1 is driven in rotation by means of sets of cone-pulleys 8 and 9, connected to one another through belts (not shown); the pulleys 9 are mounted through the intermediary of ball bearings 10 on a shaft 11, mounted, in turn, through the intermediary of a roller bearing 12 (serving as an abutment bearing) in the stationary plate 4. Under the stationary plate 5 a motor is mounted, preferably an electric one, 13, the shaft 14 of which carries a gearing plate 15. A gearing lever (not shown) makes it possible to connect the shaft 14 of the motor with the pulleys 9, at will, whereby the hollow shaft 1 of the machine is driven in rotation, or, on the contrary, to disconnect said shaft 14 from the set of pulleys 9.

Thus, the motor 13 is able to rotate continuously, the connecting of the shaft of the machine being effected at beginning of each moulding operation and the disconnecting thereof at end of said operation and so on, without entailing any fatigue of the motor due to the rapid succession of the moulding operations which formerly required the motor to start, then to stop.

A braking device of any known type actuated through a hand lever, for instance, the gearing lever (not shown) makes it possible to stop instantaneously the rotation of the shaft 1 as soon as the disconnection has been effected. As a matter of fact, it would be possible to advantageously synchronize these disconnecting and braking operations by using a single control lever.

Notches 16 are formed in the upper portion of the hollow shaft 1 to allow removable and interchangeable moulds to fit thereon, which are provided for this purpose with corresponding tenons.

17 is a plate which can be raised through jacks 18 connected to a pressure fluid compressor (not shown), for instance, provided in an appropriate number about shaft 1. Said plate 17 may be used, as will be shown later on, to open the mould and eject the moulded pieces by means of spindles, for instance, carried by the bottom of the mould, pushed up by the plate 17 when the latter is raised by the jacks 18. It may have further purposes, as will be indicated later on.

It will be noticed that the hollow control shaft 1, intended to support the removable and interchangeable moulds is entirely free at top and bottom from the part of the machine that supports it. Such an arrangement makes it possible to modify for mounting on the machine any type of mould, more particularly, molds either of the simple centrifugal type or the double centrifugal type and any means for feeding the moulds with molten metal, and, finally any other possible technical system.

A machine on which the shaft driving the moulds is completely free at top and bottom is a first characteristic of the invention and constitutes a new industrial product.

The moulds that are to be adapted on the hollow shaft 1 and which are removable and interchangeable, are formed, in the known way, with two superposed parts, a bottom and a lid which may be entirely independent from each other.

In the first case (Figs. 2 to 4), the lid 19 of the mould may be assembled with the bottom 20 of the latter through a hand lever 21, pivotable freely about the casting funnel 22 fixed to the lid 19 and held in place by a ring 23 housed in a groove 24 of said funnel. Said lever 21 comprises circular peripheral pitches 25 capable, when the lever 21 is angularly pivoted, of engaging each groove 26 formed in spindle 27 fixed to the bottom 20 of the mould.

Should the lever 21 comprise, for instance, two pitches 25 in opposition, each pitch will engage the groove 26 of a spindle 27 and, as the thickness of each pitch 25 is increasing, the lever, by pivoting, will jam strongly the pitch in the corresponding groove 26 thus causing a deep tightening of the lid 19 on the bottom 20 of the mould. Rotation in the opposite direction of the lever 21 will release each pitch 25 from the groove of its spindle 27 permitting the raising of lid 19 with the hand to open the mould after a moulding operation.

The lid 19 of the mould may also be articulated on the bottom 20 by means of hinges 28, for instance (Figs. 5 to 9).

In such a case, the operator will only have to raise the lid after the moulding operation, as he no longer has to take it away with his hand and put it aside, then take it back. His work is thereby facilitated and accelerated.

In the case of an articulated lid, the latter may be combined with or locked on the bottom of the mould, during a moulding operation by means of a bar 29 extending on the longer edge of the mould, opposite to the hinges. Said bar 29 is articulated about a shaft 30 on the bottom 20 of the mould and it comprises a continuous flange or redan 31, which engages a corresponding flange 32 of the lid 19 when the bar 29 is pivoted towards the mould thereby allowing for coupling or locking of the latter with the bottom 20.

At the same time, the flange 33' of the inner cut off corner 33 of the bar 29 will bear on the flange 34 of the bottom of the mould.

Such locking is not hand-operated but is effected through the action of centrifugal force when the mould carrying shaft 1 is driven in rotation.

The pivoting and tightening of the bar 29 against the lid 19 of the mould is effected by means of a double lever 35—36 which constitutes a heavy mass rigid with a hub 37 carried by the mould carrying shaft of the machine. Bottom 20 of said mold has a stub axle 70 rotatably extending in a correspondingly shaped recess 71 of said hub rotatably supporting said mold on said hub. Hub 37 has tenons (not shown) detachably inserted in notches 16 of shaft 1 connecting the same for rotation. When said shaft, shaft 1 of Fig. 1, for instance, is driven in rotation, the double lever 35—36 starts and rotates with it and its end edges 35'—36' strike against and drive in their motion two flanges 38 rigid with the bottom 20 of the mould. But, at the same time, the double lever 35—36 drives, through the intermediary of a shaft 39, secured on a member 40 rigid with the hub 37 by means of a screw 41, an arm 42 pivoting freely on said shaft. Said arm carries at its extremity a ball and socket joint 43 housed in a corresponding recess of said arm and mounted itself at the extremity of a part 44 integral with the locking bar 29.

The starting of the mould carrying shaft of the machine has the result of causing, through pivoting of the double lever 35—36 and abrupt oscillation of the arm 42 resulting therefrom, a prompt swivelling of the tail 44 and, in consequence, of the locking bar 29 about the shaft 30; said bar will engage tightly the flange 32 of the lid 19 of the mould as soon as the latter has been driven in rotation through the hub 37 and the double lever 35—36.

The bar 29 maintains the mould completely closed and locked during all the moulding operation, as the centrifugal force action tightly clamps the bar 29 on the lid 19. When the moulding operation is finished, and the braking is applied to the mould carrying shaft to stop it and therefore the double lever 35—36, the bottom 20 of the mould will go on rotating slightly until the flanks 38 abut against the opposite end edges of the double lever 35—36.

The assembly 43 and the tail 44 oscillate in the opposite direction under the action of inertia; the tail 44 oscillates and drives the bar 29 apart from the lid 19 which is thus freed and the operator is then capable of opening the mould by means of an operating handle 45 secured on the lid 19.

The double lever 35—36 also carries at its extremities a guide-way 46 increasing in height on which a roller 47 rolls, rotating on a shaft 48 carried by a piston 49 sliding in a cylinder 50 integral with the bottom 20 of the mould and containing a return spring 51. Said piston 49 ends in a spindle 52 which carries a member 53 housed in a recess 54 in the bottom 20 of the mould intended to support the article to be moulded. When the mould has been set into rotation, as shown hereinabove, each roller 47 rolls to the upmost point of the corresponding guideway 46 and the spindle 52 is thus raised as well as the piece 53 it carries. When the mould carrying shaft stops, each roller 47 comes back to the downmost point of its guideway 46 and the piece 53 which corresponds to each roller is then lowered through the action of the return spring 51 which tends to urge back down the corresponding piston 49 with its spindle 52. The moulded article carried by said piece 53 is thus free and ready to be removed by the operator as soon as the latter has opened the lid of the mould.

The locking of the lid 19 on the bottom 20 of the mould may also be effected (Fig. 10) by means of hooks 55 pivoted at 56 on the bottom of the mould and provided each with a counterweight 57 which the centrifugal force tends to drive apart, causing a tight locking of the lid 19 on the bottom 20 of the mould, when the latter has been set into rotation. The inertia produced by stopping the mould brings each counterweight 57 to its former position and unlocking of the lid may be helped mechanically by raising the plate 17 of Fig. 1, on which inclined abutments 58 will have been provided, acting on the counterweights 57 to bring them back into their original position.

Figs. 3 and 4 also show a device for putting in place and removing automatically spindles or hubs 59 adapted to form hollow parts in the moulded pieces. This device comprises a shaft 60 mounted in tongues 61 rigid with the bottom 20 of the mould. On said shaft a lever 62 pivots freely and carries at one extremity a counterweight 63 and articulated at the other extremity is a shaft 65 on which the heads 66 of the spindles 59 are articulated. Under the action of the centrifugal force, the counterweight 63 sets apart and causes the spindle 59 to drive down in place. When the mould stops, the inertia helped, if necessary, by the mechanical action of an inclined abutting piece similar to the preceding one 58 of the plate 17 causes the spindle 59 to return.

Fig. 11 illustrates how a mould made of two parts 19 and 20 (independent or articulated on each other) may be opened by means of pressure fluid. For instance, a plate 17 of Fig. 1 could be used raised at the proper moment by hydraulical jacks 18, for instance. By rising, this plate pushes back up spindles 67, extending across the bottom 20 of the mold in which they are retained by their heads 68. These spindles may, some of them, be used to raise the lid 19 of the mould (after molding), the other ones, to eject the moulded pieces such as A.

Of course, the arrangement which has just been described for assembling the parts of the moulds together, for opening the moulds, for ejecting the moulded pieces, for putting in place and removing the spindles or hubs are not limitative and any other similar arrangement could be contemplated without departing from the scope of the invention.

What I claim is:

1. Centrifugal casting apparatus comprising a rotatably supported two piece mold having a top and bottom section, a rotatably driven shaft, spaced apart abutments carried by said mold, a lever fixedly carried by said shaft and positioned for striking said mold abutments upon relative movement between and operatively connecting said mold and said shaft and having limited movement when out of contact with said abutments at which time said shaft is disconnected from said mold, means pivotally connected to said mold and said shaft for retaining said top section on said bottom section upon rotation of said shaft in one direction and releasing said top section upon the stopping of said shaft.

2. Centrifugal casting apparatus comprising a rotatably supported two piece mold having a top and bottom section, a pair of spaced apart abutments carried by said bottom section, a rotatably driven shaft, a lever fixedly carried by said shaft and positioned between said abutments for engaging the same and rotating said bottom section upon rotation of said shaft, a second lever pivotally connected to said shaft, a catch pivotally connected to said bottom section for at times retaining said top section on said bottom section and means swingably connecting said catch and second lever whereby said catch is brought into its retaining position upon rotation of said shaft.

3. Centrifugal casting apparatus as claimed in claim 2, wherein said means consists of a ball and socket connection between said catch and said second lever.

4. Centrifugal casting apparatus as claimed in claim 2, wherein said bottom section has a separable portion, a guided member connected to said separable portion slidably extends from said bottom section, resilient means tends to move said member and portion towards said top section and said first mentioned lever engages and moves said member against said resilient means upon movement of said lever from said abutments disengaging said mold and shaft.

5. Centrifugal casting apparatus comprising a rotatably driven shaft, a hub fixedly carried by said shaft, a two piece mold having a top and bottom section mounted for free rotation on said hub, a lever fixedly connected to said hub and extending laterally of said shaft, a pair of spaced apart abutments carried by said bottom section and positioned on opposite sides of said lever for being contacted thereby after a limited movement of said shaft for rotating said mold, said bottom section having separable portions, cylinders carried by said bottom portion, pistons each connected to one of said separable portions and being slidably mounted in one of said cylinders, springs tending to move said pistons and separable portions towards said upper section, said cylinders each having a slot provided therein, shafts each extending from one of said pistons through its corresponding cylinder slot, rollers each mounted on the end of one of said shafts, each of said levers having a tapered end with one of said rollers riding thereon whereby said rollers are moved withdrawing said separable portions into said lower section upon movement of said lever from said abutments.

6. Centrifugal casting apparatus comprising a two piece mould having superimposed top and bottom sections, a rotatably driven shaft, means fixedly carrier by said shaft for striking and imparting a sudden rotation to said mould after said shaft has begun rotation and for separating from said mould permitting the continued rotation thereof upon the stopping of said shaft, said mould being rotatably mounted on said means, a member pivotally mounted on said bottom section and capable of retaining said top section thereon and a lever pivotally connected to said means and said member for moving said member into its top section retaining position upon rotation of said shaft prior to said means striking said mould.

7. Centrifugal casting apparatus comprising a two piece mould having superimposed top and bottom sections, a rotatably driven shaft, means fixedly carried by said shaft for striking and imparting a sudden rotation to said mould after said shaft has begun rotation and for separating from said mould permitting the continued rotation thereof upon the stopping of said shaft, said mould being rotatably supported on said means, said bottom section having a separable portion and a member slidably carried by said bottom section, connected to said separable portion and operable by said means when disengaged from said mould for moving said separable portion releasing the object being molded.

References Cited in the file of this patent

UNITED STATES PATENTS

| 1,195,803 | Gardner | Aug. 22, 1916 |
| 1,302,838 | Olsen | May 6, 1919 |
| 1,304,118 | Stokes | May 20, 1919 |
| 1,486,544 | Rathbone | Mar. 11, 1924 |
| 1,693,283 | Mix | Nov. 27, 1928 |
| 1,833,347 | Avis | Nov. 24, 1931 |
| 1,983,146 | Sargent | Dec. 4, 1934 |
| 2,140,204 | Griffin | Dec. 13, 1938 |
| 2,172,798 | Littmann | Sept. 12, 1939 |
| 2,270,822 | McCarroll et al. | Jan. 20, 1942 |
| 2,415,620 | Woock | Feb. 11, 1947 |
| 2,507,388 | Toleik | May 9, 1950 |
| 2,618,031 | Mazer | Nov. 18, 1952 |

FOREIGN PATENTS

| 24,074 | Finland | Aug. 9, 1950 |
| 495,308 | Canada | Aug. 18, 1953 |